United States Patent
Geibel et al.

(10) Patent No.: US 9,605,733 B2
(45) Date of Patent: Mar. 28, 2017

(54) TENSIONING OR GUIDE RAIL HAVING AN EXTRUDED SLIDING LINING BODY

(71) Applicant: IWIS MOTORSYSTEME GMBH & CO. KG, Munich (DE)

(72) Inventors: Henning Geibel, Wessling (DE); Renzo Perissinotto, Dachau (DE)

(73) Assignee: IWIS MOTORSYSTEME GMBH & CO. KG, Munich (DE)

( * ) Notice: Subject to any disclaimer, the term of this patent is extended or adjusted under 35 U.S.C. 154(b) by 72 days.

(21) Appl. No.: 14/417,497

(22) PCT Filed: Jun. 7, 2013

(86) PCT No.: PCT/EP2013/001682
§ 371 (c)(1),
(2) Date: Jan. 26, 2015

(87) PCT Pub. No.: WO2014/015926
PCT Pub. Date: Jan. 30, 2014

(65) Prior Publication Data
US 2015/0219190 A1    Aug. 6, 2015

(30) Foreign Application Priority Data
Jul. 27, 2012  (DE) .......................... 10 2012 014 943

(51) Int. Cl.
*F16H 7/08*     (2006.01)
*F16H 7/18*     (2006.01)

(52) U.S. Cl.
CPC ................. *F16H 7/18* (2013.01); *F16H 7/08* (2013.01); *F16H 2007/0872* (2013.01); *F16H 2007/0893* (2013.01); *F16H 2007/185* (2013.01); *Y10T 29/49826* (2015.01)

(58) Field of Classification Search
CPC ...... F16H 2007/0872; F16H 7/18; F16H 7/08; F16H 2007/0804; F16H 2007/0806
USPC ......................................................... 474/111
See application file for complete search history.

(56) References Cited

U.S. PATENT DOCUMENTS

| | | | |
|---|---|---|---|
| 3,812,733 A * | 5/1974 | Yoshida ................ | F16H 7/0848 474/111 |
| 4,832,664 A | 5/1989 | Groger et al. | |
| 5,318,482 A * | 6/1994 | Sato .......................... | F16H 7/08 474/111 |

(Continued)

FOREIGN PATENT DOCUMENTS

| | | |
|---|---|---|
| DE | 3706136 C1 | 9/1988 |
| DE | 4310306 A1 | 10/1994 |

(Continued)

*Primary Examiner* — Henry Liu
(74) *Attorney, Agent, or Firm* — Baker and Hostetler LLP (57) ABSTRACT

A tensioning or guide rail and a method of producing a tensioning or guide rail for an endless drive means are provided, in particular for a chain drive in an internal combustion engine, comprising a supporting body and a sliding body of plastic material arranged on the supporting body. The method comprises the steps of producing a sliding body profile strand and separating the individual sliding body from the sliding body profile strand. The sliding body of a tensioning or guide rail is a segment of such a sliding body profile strand, the plastic material being oriented in a longitudinal direction.

6 Claims, 6 Drawing Sheets

(56) References Cited

U.S. PATENT DOCUMENTS

| | | | | |
|---|---|---|---|---|
| 5,647,811 A * | 7/1997 | Mott | F16H 7/08 184/16 |
| 5,813,935 A * | 9/1998 | Dembosky | F16H 7/18 474/111 |
| 5,820,502 A | 10/1998 | Schulze | |
| 6,302,816 B1 * | 10/2001 | Wigsten | F16H 7/18 474/111 |
| 7,056,246 B2 * | 6/2006 | Foster | F16H 7/18 474/111 |
| 2005/0090344 A1 * | 4/2005 | Foster | F16H 7/18 474/111 |
| 2005/0090346 A1 * | 4/2005 | Foster | F16H 7/18 474/140 |
| 2006/0025256 A1 * | 2/2006 | Wake | F16H 7/08 474/111 |
| 2006/0040774 A1 * | 2/2006 | Hirayama | F16H 7/18 474/111 |
| 2006/0084537 A1 * | 4/2006 | Matsushita | F16H 7/0836 474/109 |
| 2006/0172835 A1 * | 8/2006 | Konno | F16H 7/18 474/111 |
| 2006/0172836 A1 * | 8/2006 | Mori | F16H 7/18 474/111 |
| 2006/0199689 A1 * | 9/2006 | Yoshimoto | F16H 7/18 474/111 |
| 2006/0205548 A1 * | 9/2006 | Konno | F16H 7/18 474/111 |
| 2006/0223661 A1 * | 10/2006 | Haesloop | F16H 7/0831 474/111 |
| 2006/0293136 A1 * | 12/2006 | Markley | F16H 7/08 474/140 |
| 2008/0254926 A1 * | 10/2008 | Schuseil | F01L 1/024 474/111 |
| 2009/0029814 A1 * | 1/2009 | Schuseil | F16H 7/18 474/111 |
| 2009/0036242 A1 * | 2/2009 | Hayami | F16H 7/18 474/111 |
| 2009/0215562 A1 * | 8/2009 | Lang | F16H 7/14 474/111 |
| 2009/0239692 A1 * | 9/2009 | Heinrich | F16H 7/08 474/111 |
| 2013/0035184 A1 * | 2/2013 | Konno | F16H 7/18 474/111 |

FOREIGN PATENT DOCUMENTS

| | | |
|---|---|---|
| DE | 29602917 U1 | 7/1997 |
| DE | 19728675 A1 | 1/1998 |
| DE | 10333077 A1 | 2/2005 |
| DE | 10346642 A1 | 5/2005 |

* cited by examiner

TENSIONING OR GUIDE RAIL HAVING AN EXTRUDED SLIDING LINING BODY

CROSS-REFERENCE TO RELATED APPLICATIONS

This application is a National Stage of International patent application PCT/EP2013/001682, filed on Jun. 7, 2013, which claims priority to foreign German patent application No. DE 102012014943.3, filed on Jul. 27, 2012, the disclosure of which are incorporated by reference in their entirety.

FIELD OF THE INVENTION

The present invention relates to a method of producing a tensioning or guide rail for an endless drive means, in particular for a chain drive in an internal combustion engine, comprising a supporting body and a sliding body arranged on the supporting body. In addition, the present invention relates to such a tensioning or guide rail in which the sliding body made of plastic material has a sliding surface for contacting the endless drive means.

BACKGROUND

In technology, a large number of tensioning or guide rails is used for internal combustion engines, in particular for timing drives. In this field of use, high demands have to be satisfied with respect to the strength of the rails as well as the sliding and guiding characteristics in the area of contact with the flexible, endlessly circulating drive means of the timing drive. The endless drive means must be kept under a defined tension during operation. At the same time, tolerances and elongations of the drive means resulting from the respective operating conditions must be compensated for in the timing drive. Therefore, tensioning or guide rails are normally configured as bipartite elements comprising a supporting body and a sliding body arranged on the supporting body. The supporting body is often provided with a truss structure, which improves the strength of the rails, and is manufactured as a die-cast aluminum profile or a fiber-reinforced plastic profile. Due to the different demands that have to be satisfied by the sliding surface of the sliding body for contact with the endless drive means, the sliding body is produced from a different material in a separate production step, said material having the desired sliding and guiding characteristics for pressure contact with an endless drive means. For reasons of wear, the sliding body may also be configured such that it can be exchanged.

DE 296 02 917 U1 discloses a tensioning or guide rail for a timing chain drive, comprising a supporting body made of filled or fiber-reinforced plastics and a sliding body made of low-friction plastics. The supporting body and the sliding body are produced separately of one another as prefabricated structural units. During final assembly, the sliding body is mechanically connected to the supporting body by means of form-fit elements on the lower side of the sliding lining carrier, said supporting body having appropriate cutouts for receiving the form-fit elements therein.

Another tensioning or guide rail is described in DE 43 103 06 A1. Also in the case of these rails, the supporting body is produced from fiber-reinforced plastics by means of an injection molding process. For connecting the sliding body including the sliding surface, the bearing surface of the body has formed therein undercut grooves which extend over the entire length of the supporting body. For attaching the sliding body, said supporting body is placed in a mold, in which the sliding body is injection molded onto the prefabricated supporting body. By means of the undercut grooves, a very strong bond is accomplished between the supporting body and the sliding body, which can, however, no longer be released. Since this manufacturing method is very work-intensive and the supporting body must be positioned precisely so that the sliding body can be connected thereto by injection molding, this manufacturing method is, in total, very cost-intensive.

Although many of the tensioning and guide rail structural designs known in the prior art proved to be very useful in practice, it is, due to the general pressure for innovations in the field of automotive industry, constantly endeavored to improve structural designs and to adapt them to the increasing demands. In addition, tensioning or guide rails are mass-produced articles which, with respect to the high numbers of pieces involved, constantly necessitate that the structural designs used are replaced by less expensive or synergetic concepts.

SUMMARY OF THE INVENTION

It is therefore the object of the present invention to develop a method for producing a tensioning or guide rail at a reasonable price as well as to provide a tensioning or guide rail that can be produced at a reasonable price.

As far as the method of producing a tensioning or guide rail is concerned, this object is achieved by the following method steps: producing a sliding body profile strand and separating the sliding body from the sliding body profile strand.

In contrast to the hitherto known methods, according to which the sliding lining bodies were produced individually such that they were adapted to a specific supporting body, the present invention adopts a completely different approach by producing first a sliding body profile strand and dividing this sliding body profile strand into individual sliding lining bodies only in a second step, so that a single separated sliding body can then, in turn, be arranged on an arbitrary supporting body. This course of action can, on the one hand, reduce the storage cost, since the sliding body profile strands can be stored as a whole and have to be separated only a short time before they are subjected to further processing. In addition, the sliding body profile strands can be used with different supporting bodies, so that the use of different injections molds for different supporting bodies can be dispensed with. Furthermore, it is possible to produce special sliding lining bodies from other materials or with other surfaces without generating additional tool costs.

Preferably, the sliding body profile strand can be produced by means of extrusion molding or extrusion injection molding. These methods proved to be particularly useful in practice for producing long, thin-walled and structured components. In addition to extrusion molding or extrusion, where thermosetting materials are normally processed at high pressures, extrusion injection molding or an ejection process can also be used for processing viscous thermoplastics on comparatively small injection molding machines with small closing forces.

According to an expedient embodiment, the sliding body profile strand is produced in the longitudinal direction of the sliding body. A production of the sliding body profile strand in the longitudinal direction of the sliding body, in which the endless drive means runs or slides over the sliding surface of the sliding body during operation of the tensioning or guide rail, allows the continuous production of long rods or, if necessary, a direct separation of the sliding body profile strand subsequent to the extrusion device. The production of the sliding body profile strand in the direction of movement of the timing chain or of some other endless drive means prevents, due to the orientation of the material in the longitudinal direction of the sliding body, weak points, such as extrusion seams or areas of degenerated plastic material, in the transverse direction of the sliding body and avoids thus a higher reject rate or premature failure of the tensioning or guide rails.

In a further method step, the sliding body can be subjected to a finishing treatment for adapting it to an associated bearing surface of the supporting body, the bearing surface being adequately configured for arranging the sliding body on the supporting body. This finishing step provided after the division of the sliding body profile strand into individual sliding lining bodies allows processing of the surface of the sliding body for smoothing the cut edges formed during the separating step as well as the provision of apertures and slots in the sliding body for the purpose of adaption to projecting elements of the bearing surface or for accommodating fastening elements.

According to an advantageous embodiment, the method can take into account that, in a further step, the sliding body is pressed on or pushed onto an associated bearing surface of the supporting body for mounting the sliding body on the supporting body. Pressing or pushing on the individual sliding lining bodies are simple and fast mounting steps for arranging the sliding body on the supporting body and allow thus fast and inexpensive mounting of the tensioning or guide rails.

In addition, the present invention relates to a tensioning or guide rail for endless drive means, comprising a supporting body and a sliding body of plastic material, the sliding body being a segment of an elongate sliding body profile strand, and the plastic material of the sliding body being oriented in a longitudinal direction. Due to the use of a segment of a sliding body profile strand, the plastic material is, according to the production of the strand, oriented in accordance with the production direction, e.g. the extrusion direction, in the longitudinal direction of the profile strand. Accordingly, the extrusion lines or seams formed e.g. during the extrusion process and areas of material degraded during production will always be oriented in the longitudinal direction relative to the profile strand, so that the sliding body will not exhibit production-dependent weak points transversely to the longitudinal direction, which, in view of the small cross-sectional area, lead to premature failure of the rail or an increased reject rate.

According to an advantageous embodiment, the sliding body has lateral guide sections, said lateral guide sections projecting relative to the sliding surface for laterally guiding the endless drive means. Through the lateral delimitation from the endless drive means, the lateral guide sections enable the tensioning or guide rail to function reliably during operation.

For securing and fixing the sliding body on the associated bearing surface of the supporting body, the sliding body may comprise at least one cutout, which is in engagement with a positioning element formed in or attached to an associated bearing surface of the supporting body. Due to the finishing treatment to which the individual sliding lining bodies are subjected, adequate cutouts and slots can be provided on the sliding body, and the sliding body can thus be adapted to a respective supporting body. Suitable positioning elements may here be formed integrally with the supporting body.

For laterally guiding the sliding body on the bearing surface and for securing it against lateral displacement, the sliding body may have at least one positioning web on its back facing away from the sliding surface, said positioning web being configured for engagement with the surface profile of an associated bearing surface of the supporting body. Such a positioning web, which projects e.g. from the back of the sliding body, improves the lateral fixing of the sliding body and guarantees reliable positioning during assembly and during operation, without burdening the production costs through increased mounting efforts. The positioning web may here be provided with an undercut, which encompasses the bearing surface of the supporting body in a form-fit manner at least in certain areas thereof and which thus fixes the sliding body to the supporting body. It will be advantageous to provide two positioning webs with oppositely directed undercuts, which reliably fix the sliding body to the supporting body even if lateral forces occur.

In order to provide easy mounting, an associated bearing surface of the supporting body may have formed thereon a projection or a pocket, so as to form a stop for the sliding body or accommodate the ends of the sliding body when the latter has been mounted on the supporting body. Such a projection or such a pocket prevents a displacement of the sliding body in the longitudinal direction during operation.

BRIEF DESCRIPTION OF THE DRAWINGS

Making reference to the following drawings, two embodiments of the tensioning or guide rail according to the present invention are explained in more detail. The individual figures show.

DETATILED DESCRIPTION

Figure 1:
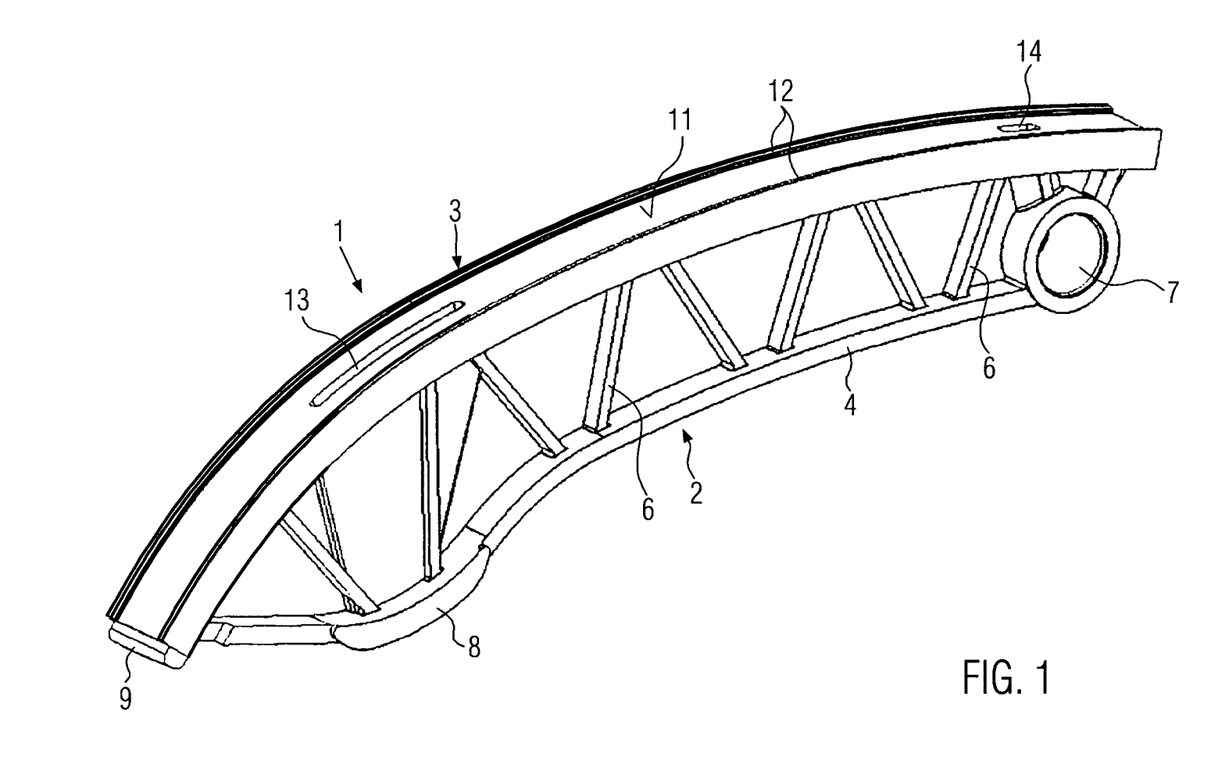
FIG. 1 a perspective view of a tensioning or guide rail according to the present invention, FIG. 2 a perspective view of the individual components of the tensioning or guide rail according to FIG. 1, FIG. 3*a* a fragmentary perspective view of the supporting body according to FIG. 2, FIG. 3*b* a fragmentary perspective view of the sliding body according to FIG. 2, FIG. 3*c* a fragmentary perspective view of the tensioning or guide rail according to FIG. 1, FIG. 4 a perspective view of a further embodiment of a tensioning or guide rail according to the present invention, FIG. 5 a perspective view of the individual components of the tensioning or guide rail according to FIG. 4, FIG. 6*a* a perspective view of the tensioning or guide rail according to FIG. 4 in a first assembly view, and FIG. 6*b* a perspective view of the tensioning or guide rail according to FIG. 4 in a second assembly view.

FIG. 1 shows a perspective side view of a tensioning or guide rail 1 according to the present invention configured in the form of a tensioning rail. This tensioning or guide rail 1 is bipartite and comprises a supporting body 2 and a sliding body 3 mounted thereon. The supporting body 2 comprises a lower longitudinal support 4 and an upper longitudinal support 5, which can be seen more clearly in FIG. 2, said lower and upper longitudinal supports being interconnected via cross members 6 for establishing a truss structure. The open areas of the truss structure delimited by the lower longitudinal support 4, the upper longitudinal support 5 and the cross member 6 may be interrupted by a central partition for improved stability. At the bearing end shown in FIG. 1 on the right end of the tensioning rail 1, a pivot bearing bushing 7 is formed between the lower longitudinal support 4 and the cross members 6. At the tensioning end located opposite the bearing end, the lower longitudinal support 4 is reinforced in a press-on area 8 so that a tensioning device (not shown) can be brought into contact with this press-on area 8.

The sliding body 3 has an upwardly directed smooth sliding surface 11 on which an endless drive means (not shown), such as a timing chain, slides over the tensioning or guide rail 1. The sliding surface 11 has provided thereon guide sections 12 which extend laterally when seen in the longitudinal direction, said guide sections 12 projecting from the sliding surface 11 substantially perpendicular thereto and defining a lateral guide for the endless drive means. In addition, the sliding surface 11 has provided thereon a longitudinal slot 13 in the area of the tensioning end as well as a further cutout 14 in the area of the bearing end.

Figure 2:
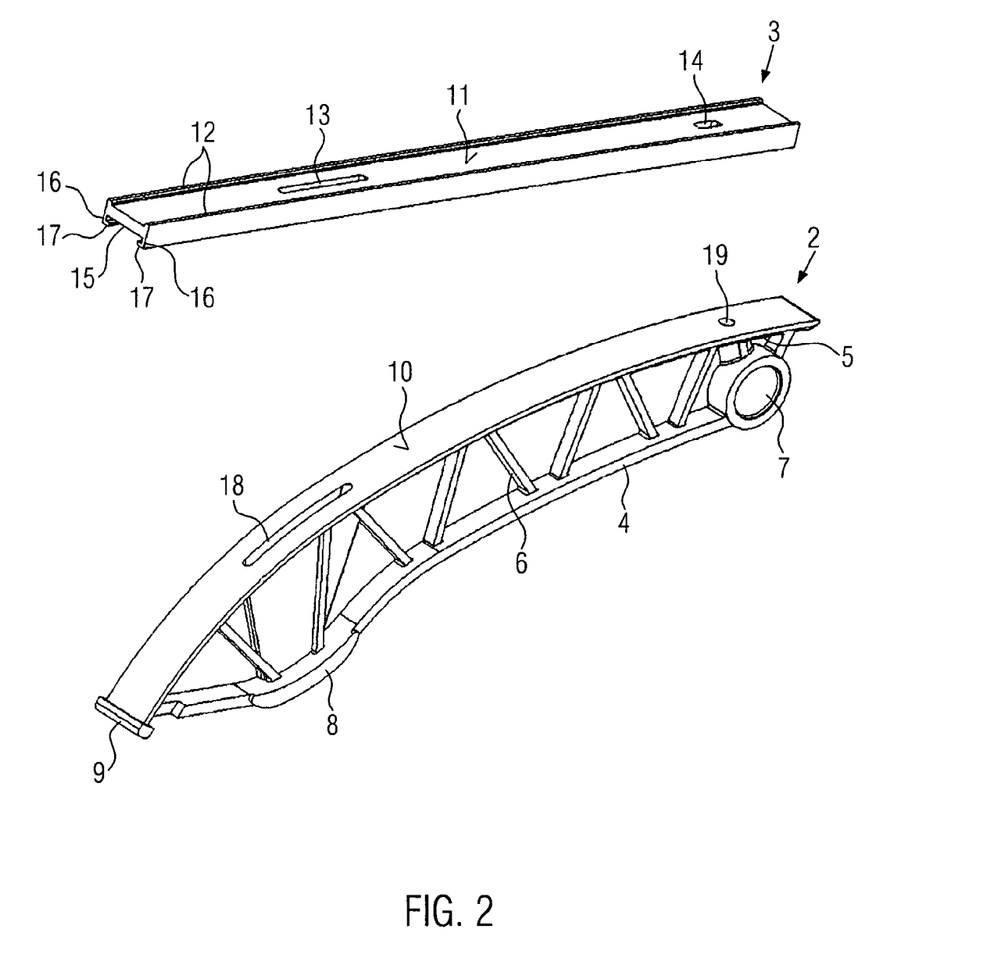

The bipartite tensioning or guide rail 1 is shown in FIG. 2 in a non-mounted condition. In this representation it can be seen that the sliding body 3 is substantially straight in the non-mounted condition, since the sliding body 3 adapts itself to the curved shape of the tensioning rail 1 only in the mounted condition. On the back 15 of the sliding body 3, positioning webs 16 are provided on both longitudinal sides, said positioning webs 16 projecting perpendicularly from said back 15 thus forming extensions of the lateral guides 12 and cooperating with the bearing surface 10 of the supporting body 2 for lateral positioning of the sliding body 3. At the ends of the positioning webs 16 undercuts 17 are provided in the longitudinal direction, the respective undercuts 17 facing inwards and extending over the entire length of the positioning webs. In the mounted condition, the undercuts 17 engage behind the bearing surface 10 of the supporting body 2 and allow a firm fit of the sliding body 3 on the supporting body 2. The sliding body 3 is produced from an extrudable plastic material having good sliding characteristics, preferably by extrusion molding or extrusion injection molding, and is cut off from a longer sliding body profile strand according to the required length of the sliding body 3.

On the individual supporting body 2 shown in FIG. 2, also the limit stop 9 can clearly be seen on the upper longitudinal support 5 at the outermost tensioning end of the rail 1, said limit stop 9 adjoining the bearing surface 10 in side-by-side relation therewith. While the limit stop 9 prevents, in the mounted condition of the tensioning or guide rail 1, an inadvertent displacement of the sliding body 3 on the bearing surface 10 of the supporting body 2 beyond the limit stop 9, the bearing surface 10 serves as a bearing- and counterface for the back 15 of the sliding body 3. The positioning webs 16 are here positioned laterally of the bearing surface 10, while the undercuts 17 on the positioning webs 16 engage behind the bearing surface 10. The bearing surface 10 has provided thereon a slot 18 in the area of the tensioning end, said slot 18 matching the front slot 13 in the sliding body 3, and an opening 19 at the bearing end, said opening 19 matching the cutout 14 in the sliding body 3. In the slot 13 of the sliding body 3 and in the slot 18 of the bearing surface 10 of the supporting body 2 additional positioning elements can be provided for laterally securing and fixing the sliding body 3 on the supporting body 2. Via the cutout 14 on the sliding body 3 and the opening 19 in the bearing surface 10, an additional fixing element, e.g. a screw or a locking rivet, can be inserted for fixing the sliding body 3 on the supporting body 2. The supporting body 2 may preferably be produced from plastics, e.g. a vinyl resin-based, fiber-reinforced thermosetting material, or it may be configured as an aluminum die-cast component.

Figure 3A:
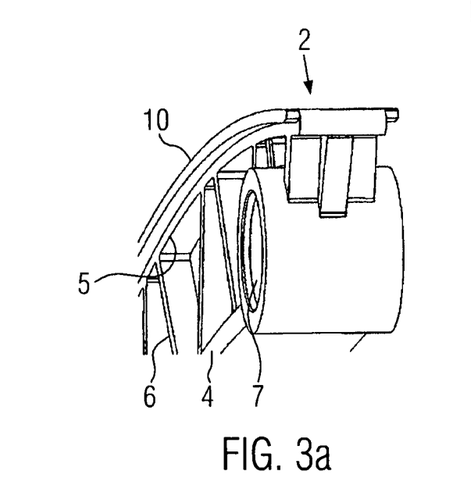
Figure 3B:
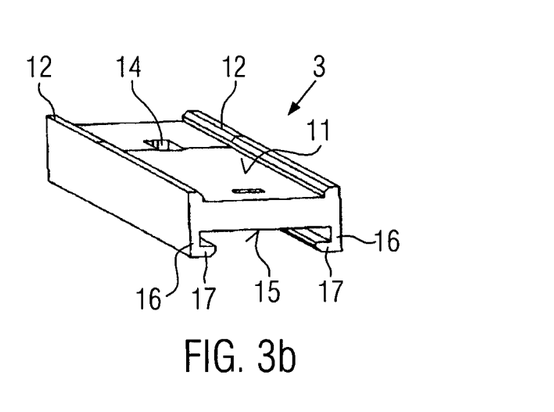
Figure 3C:
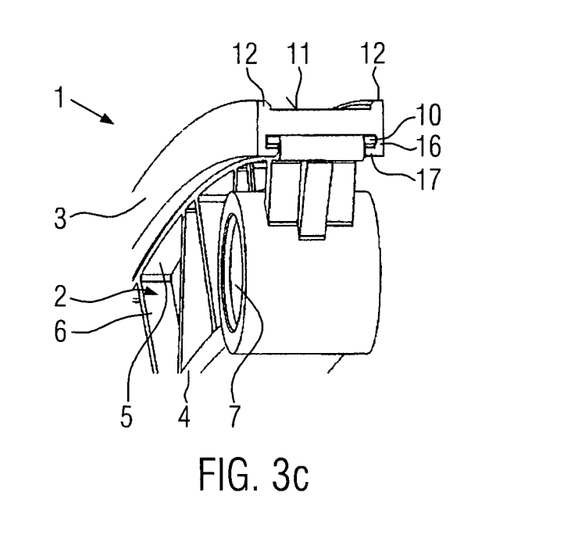

FIGS. 3a to 3c show various perspective end-on views of the bearing end of the tensioning or guide rail 1 with the pivot bearing bushing 7. FIGS. 3a and 3bshow here the supporting body 2 and the sliding body 3 as non-mounted individual components, whereas FIG. 3c shows the bearing end of the assembled tensioning or guide rail 1 according to FIG. 1. The bearing surface 10, which is disposed on the upper longitudinal support 5 of the supporting body 2, projects beyond said upper longitudinal support 5 thus forming a small protrusion that can be encompassed in a form-fit manner by the positioning webs 16 and the undercuts 17 of the sliding body 3. The end face of the bearing surface 10 and of the upper longitudinal support 5 is here configured without any additional blocking elements, so that, in spite of the lateral positioning webs 16 and the undercuts 17, the sliding body 3 can be pushed onto the bearing surface 10 from the bearing end of the supporting body 2. As can be seen in FIG. 3b, the distance between the positioning webs 16 projecting in the longitudinal direction from the back 15 of the sliding body 3 is wide enough for receiving therebetween the bearing surface 10 of the supporting body 2. Also the distance between the undercuts 17, which are configured as locking projections, and the back 15 of the sliding body 3 is chosen large enough for allowing the bearing surface 10 to be easily accommodated therebetween and for nevertheless allowing the sliding body 3 to be pushed on from the bearing end of the supporting body 2. This can also be seen clearly in the end-on view of the bearing end of the mounted tensioning or guide rail 1 in FIG. 3c. The sliding body 3 that has been pushed onto the supporting body 2 up to the limit stop 9 adapts itself to the curved shape of the bearing surface 10 of the supporting body 2 and its end face is flush with the end of the supporting body 2.

Figure 4:
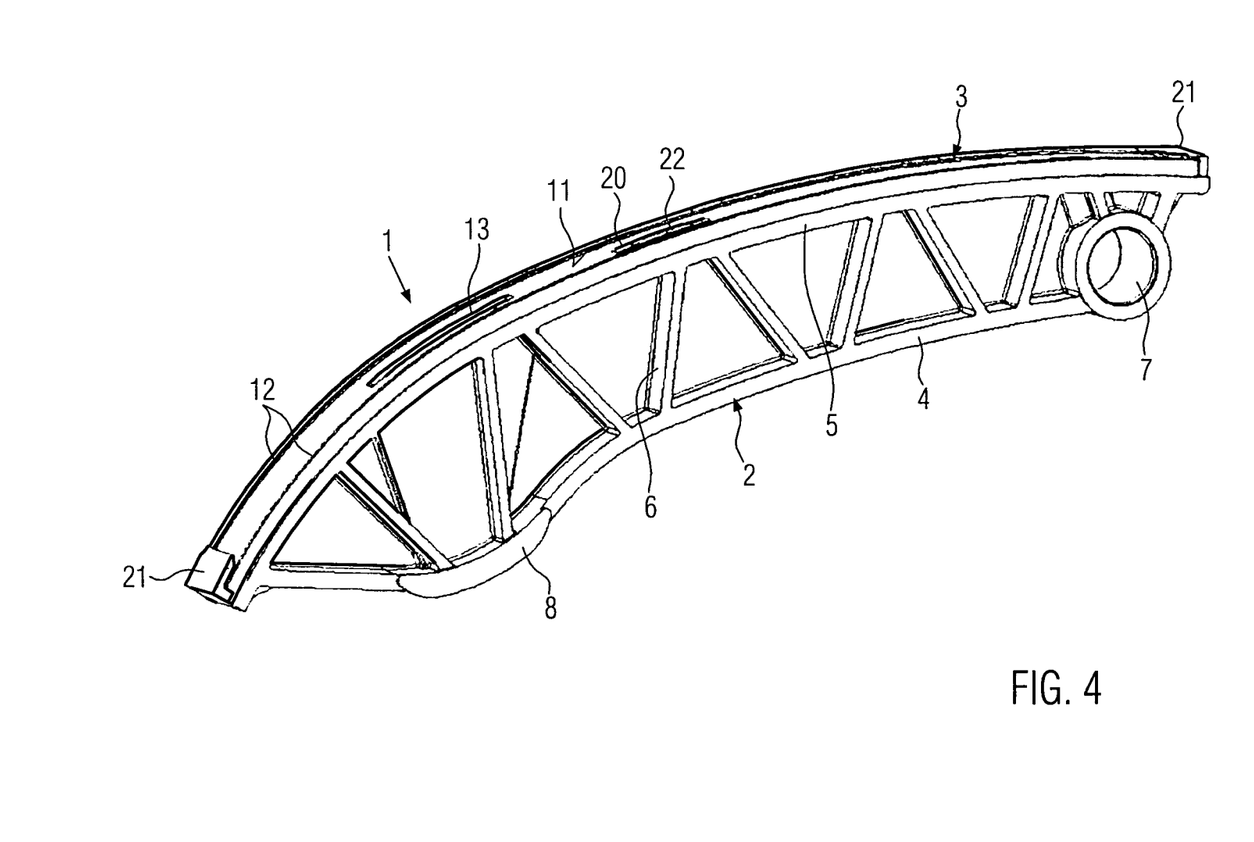
Figure 5:
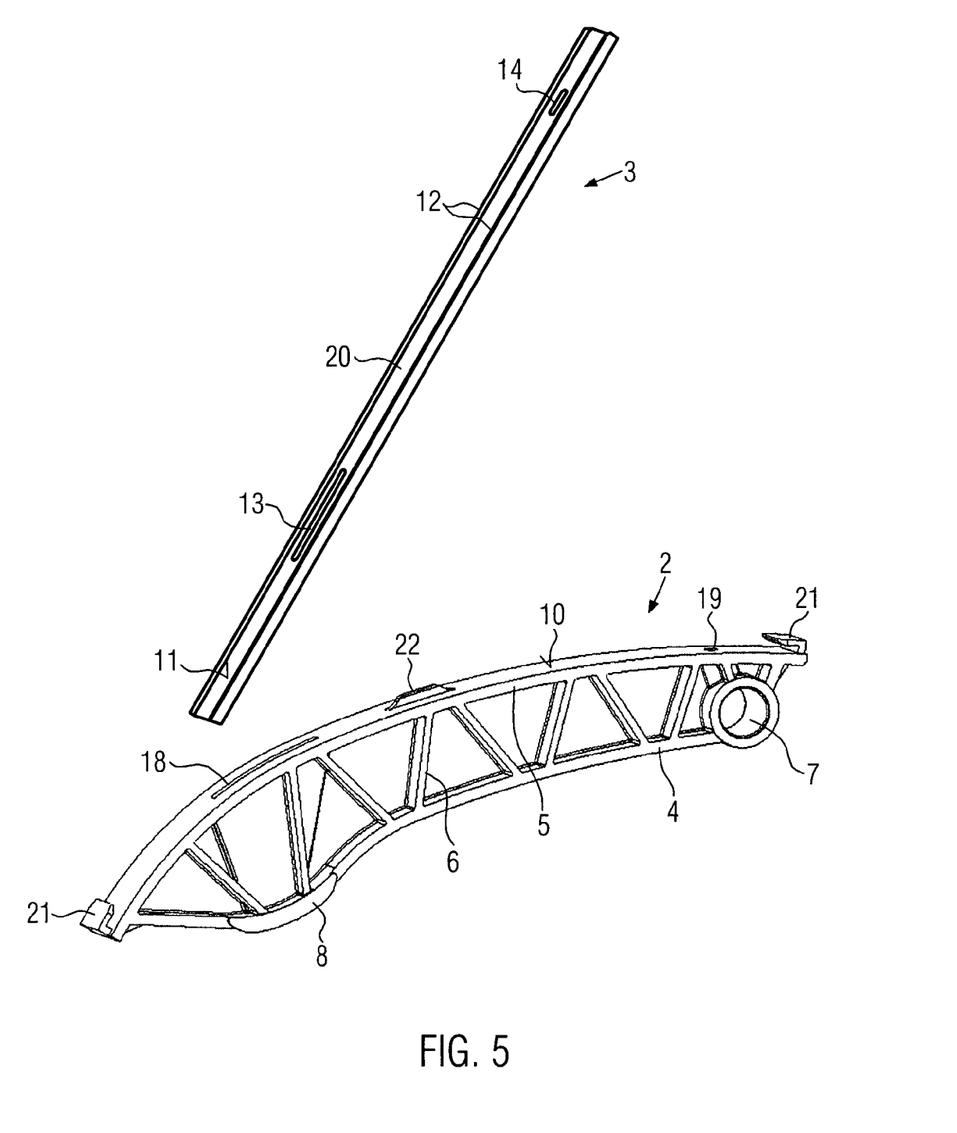
Figure 6A:
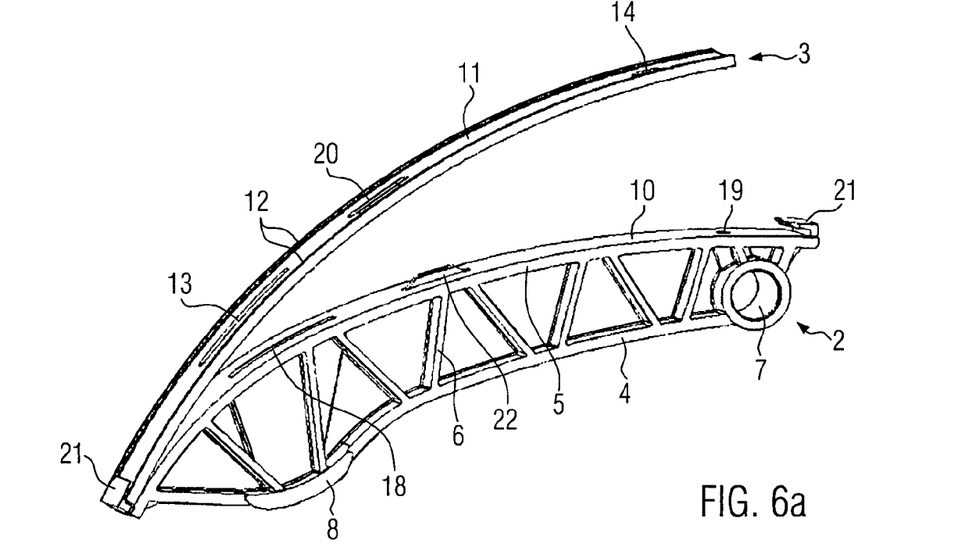
Figure 6B:
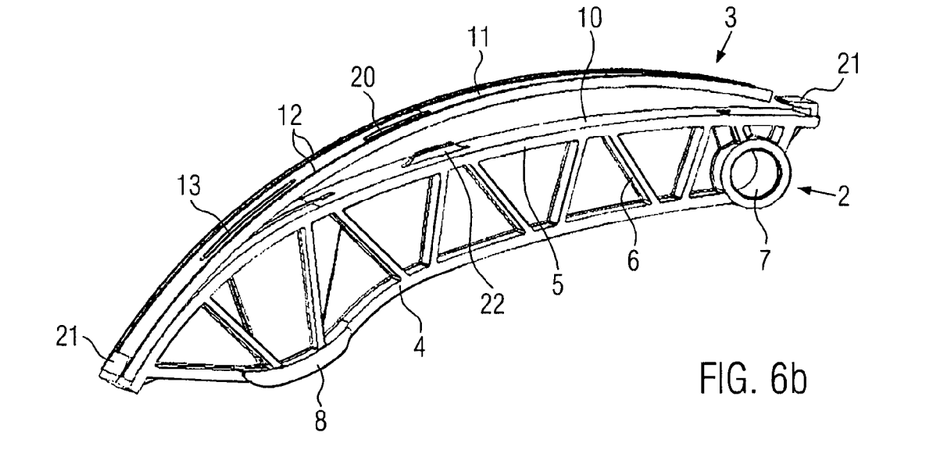

Another embodiment of a tensioning or guide rail 1 according to the present invention is shown in FIGS. 4 to 6. The features discussed hereinbelow are substantially the differing features of the different embodiments, whereas all those features of this further embodiment of a tensioning or guide rail 1 which are not described in detail are configured in accordance with the features that have been described in detail in the first embodiment in connection with FIGS. 1 to 3. As can be seen from the perspective side view of the tensioning or guide rail 1 in FIG. 4, said tensioning or guide rail 1 is again configured as a tensioning rail with a pivot bearing bushing 7 arranged on the bearing end and a press-on area 8 provided on the tensioning area. The supporting body 2 of this tensioning or guide rail 1 according to the present invention is again configured as a truss structure comprising a lower longitudinal support 4, an upper longitudinal support 5 and cross members 6. The supporting body 2 is here provided with pockets 21 on the end faces of the tensioning end and of the bearing end, said pockets 21 having the sliding body 3 inserted therein. The sliding surface 11 of the sliding body 3 has provided therein a second slot 20, in addition to the slot 13 in the tensioning area of the rail 1 and the cutout 14 in the bearing area, said slot 20 being positioned between the slot 13 and the cutout 14.

The additional embodiment of a bipartite tensioning or guide rail 1 according to FIG. 4 is shown in FIG. 5 is a non-mounted condition. Here, it can be seen once more that the sliding body 3 is substantially straight in the non-mounted condition and adapts itself to the curved shape of the bearing surface 10 of the supporting body 2 only in the mounted condition. The pockets 21 arranged at the end faces of the bearing surface 10 are L-shaped and configured such that their width is narrower than that of the bearing surface 10, so that, in the assembled condition, the portions of the L-shape directed inwards, when seen in the direction of the bearing surface 10, are positioned over the sliding surface 11 of the sliding body 3. In this embodiment, the bearing surface 10 is simultaneously also the upper longitudinal support 5 of the supporting body 2 without projecting laterally therebeyond. In addition to the slot 18 and the opening 19 in the bearing surface 10, a ridge 22 is here provided, which projects from the bearing surface 10 and matches the second slot 20 in the sliding body 3. In accordance with the smooth embodiment of the bearing surface 10, the sliding body 3 of this second embodiment of a tensioning or guide rail 1 according to the present invention is, apart from the lateral guides 12 on the sliding surface 11, not provided with any positioning webs 16 with undercuts 17 on the back 15 thereof.

In FIGS. 6a and 6b it can be seen that, for mounting the sliding body 3 in the case of the second embodiment of the tensioning or guide rail 1, one end of the sliding body 3 is first inserted into one of the pockets 21 on the end faces of the bearing surface 10. The free leg of the L-shaped pockets 21 extends here over the sliding surface 11 of the sliding body 3. For laterally fixing the sliding body 3 in the pocket 21, the pockets 21 are configured such that their width corresponds to or is narrower than the width of the sliding surface 11, so that the lateral guides 12 extend next to the free leg of the pockets 21 thus preventing a lateral displacement of the sliding body 3. Subsequently, the sliding body 3 is, as shown in FIG. 6b, bent beyond the curvature predetermined by the bearing surface 10 of the supporting body 2, so that the second end of the sliding body 3 can be introduced in the second pocket 21 at the bearing end of the tensioning rail 1. Also in this case, the pocket 21 is so narrow that the free leg of the pocket 21 extends over the sliding surface 11, but is laterally secured in position by the lateral guides. The ridge 22 projecting centrally on the bearing surface 10 matches the second slot 20 of the sliding body 3. By means of the head of the ridge 22, which is slightly increased in width, the sliding body 3 is fixed in position on the bearing surface 10 of the supporting body 2.

The respective sliding lining bodies 3 used in the two embodiments of a tensioning or guide rail 1 according to the present invention shown in FIGS. 1 and 4 are produced by means of an extrusion process (extrusion molding) or, alternatively, by means of extrusion injection molding. The sliding body 3 is here first produced in the form of long rods and is cut to length only a short time prior to the final assembly, or extruded as an endless strand which is cut to an adequate length immediately after the extrusion process.

The use of an extrusion process or of extrusion injection molding for the production of sliding lining bodies 3 reduces not only the manufacturing costs due to the continuous mode of operation in comparison with the production of individual sliding lining bodies 3 by means of injection molding, but avoids also additional tool costs for the production of similar sliding lining bodies 3 having identical cross sections but different lengths. In addition, sliding lining bodies 3 in the form of sliding body profile strands can easily be kept in store and can also be utilized in the development of new tensioning or guide rails 1 and replace the production of expensive prototypes. Another positive effect of the production of sliding lining bodies 3 from a sliding body profile strand is the uniform orientation of the plastic material in the sliding body. When a sliding body profile strand is being produced by extrusion or extrusion injection molding, a directed feed of material oriented in the longitudinal direction of the sliding body 3 takes place, so that possibly developing extrusion seams and areas of degraded material will inevitably extend in the longitudinal direction of the sliding body 3 and will thus not cause any risks as regards fracturing or damaging of the sliding body 3. When sliding lining bodies are, however, injection molded in injection molds, the plastic material flows from the gate into all directions, so that differently oriented fronts will form, which, due to the collision of two melt fronts or the accumulation of degraded material, lead, in different cross-sectional regions of the sliding body 3, to weak points in the comparatively small cross-sectional area of the sliding body 3 transversely to the longitudinal direction and thus to the risk of failure.

The invention claimed is:

1. A tensioning or guide rail-for an endless drive means comprising a supporting body-and a sliding body of plastic material arranged on the supporting body, the sliding body having a sliding surface for contacting the endless drive means, the sliding body is a segment of a sliding body profile strand and the plastic material of the sliding body being oriented in a longitudinal direction, and
    wherein the sliding surface of the sliding body includes a longitudinal slot, and the supporting body having a ridge projecting centrally from the bearing surface and positioned away from the end faces of the bearing surface, wherein the ridge matches the slot in the sliding body.

2. The tensioning or guide rail according to claim 1, wherein the sliding body has lateral guide sections, said lateral guide sections projecting relative to the sliding surface for laterally guiding the endless drive means.

3. The tension or guide rail according to claim 1, wherein the sliding body comprises at least one cutout which is in engagement with a positioning element formed on or attached to the bearing surface of the supporting body.

4. The tension or guide rail according to claim 1, wherein the sliding body has at least one positioning web on its back facing away from the sliding surface, the positioning web being configured for engagement with the surface profile of the bearing surface of the supporting body.

5. The tension or guide rail according to claim 4, wherein the positioning web is provided with an undercut.

6. The tension or guide rail according to claim 1, wherein at least one end face of the bearing surface of the supporting body having a projection or a pocket providing an end stop for the sliding body.

* * * * *